US011748561B1

(12) United States Patent
Stewart

(10) Patent No.: US 11,748,561 B1
(45) Date of Patent: Sep. 5, 2023

(54) APPARATUS AND METHODS FOR EMPLOYMENT APPLICATION ASSESSMENT

(71) Applicant: MY JOB MATCHER, INC., Austin, TX (US)

(72) Inventor: Arran Stewart, Austin, TX (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 17/695,128

(22) Filed: Mar. 15, 2022

(51) Int. Cl.
| G06F 40/40 | (2020.01) |
| G06F 40/205 | (2020.01) |
| G06Q 10/06 | (2023.01) |
| G06Q 10/10 | (2023.01) |
| G06Q 10/1053 | (2023.01) |
| G06Q 10/0631 | (2023.01) |

(52) U.S. Cl.
CPC ........... *G06F 40/205* (2020.01); *G06F 40/40* (2020.01); *G06Q 10/06311* (2013.01); *G06Q 10/1053* (2013.01)

(58) Field of Classification Search
CPC . G06F 40/205; G06F 40/40; G06Q 10/06311; G06Q 10/1053
USPC ............................................................ 704/9
See application file for complete search history.

(56) References Cited

U.S. PATENT DOCUMENTS

| 10,078,781 B2 * | 9/2018 | Meyer | G06Q 10/10 |
| 10,255,602 B2 * | 4/2019 | Wang | G06Q 20/4016 |
| 10,268,713 B2 * | 4/2019 | Kasravi | G06F 16/2455 |
| 10,530,577 B1 * | 1/2020 | Pazhoor | H04L 9/3247 |
| 11,146,394 B2 * | 10/2021 | Pazhoor | H04L 63/107 |
| 11,163,999 B2 * | 11/2021 | Arshad | G10L 15/22 |
| 2007/0094259 A1 * | 4/2007 | Shi | G06Q 30/02 707/999.009 |
| 2009/0150166 A1 * | 6/2009 | Leite | G06Q 10/105 705/320 |
| 2009/0164282 A1 * | 6/2009 | Goldberg | G06F 16/353 705/321 |
| 2009/0205051 A1 * | 8/2009 | Spinelli | G06Q 20/00 726/26 |
| 2012/0078779 A1 * | 3/2012 | Robertson | G06Q 40/02 705/38 |
| 2012/0095933 A1 * | 4/2012 | Goldberg | G06F 16/335 705/321 |

(Continued)

FOREIGN PATENT DOCUMENTS

JP 2021064265 A * 4/2021

*Primary Examiner* — Edwin S Leland, III
(74) *Attorney, Agent, or Firm* — CALDWELL INTELLECTUAL PROPERTY LAW

(57) ABSTRACT

Aspects relate to apparatuses and methods for integrated application tracking. An exemplary apparatus includes a cloud platform, a processor, and a memory communicatively connected to the processor, the memory containing instructions configuring the processor to receive a plurality of user data related to a user, parse the plurality of user data into a key work record, generate a user metric, as a function of the key work record, based on a plurality of weighted values reflecting desirability, wherein generating the user metric includes identifying at least a negative factor in the key work record, and adjusting the plurality of weighted values as a function of the at least a negative factor and a temporal displacement of the at least a negative factor.

16 Claims, 7 Drawing Sheets

(56) References Cited

U.S. PATENT DOCUMENTS

| | | | |
|---|---|---|---|
| 2012/0096521 A1* | 4/2012 | Peddada | H04L 41/28 726/4 |
| 2012/0101955 A1* | 4/2012 | Mosher | G06Q 30/0207 705/321 |
| 2012/0221359 A1* | 8/2012 | Garza | G06Q 40/08 705/4 |
| 2013/0247146 A1* | 9/2013 | Lyon | G06Q 20/4016 726/3 |
| 2017/0039523 A1* | 2/2017 | Rotimi | G06Q 10/1053 |
| 2018/0129651 A1* | 5/2018 | Latvala | G06F 40/40 |
| 2018/0285840 A1* | 10/2018 | Hasan | H04L 63/0861 |
| 2019/0019160 A1* | 1/2019 | Champaneria | G06N 5/04 |
| 2019/0073676 A1* | 3/2019 | Wang | H04W 4/029 |
| 2019/0102704 A1* | 4/2019 | Liu | G06N 20/00 |
| 2019/0114593 A1* | 4/2019 | Champaneria | G06F 16/3326 |
| 2019/0163668 A1* | 5/2019 | Borje | G06N 20/10 |
| 2019/0188723 A1* | 6/2019 | Wang | G06Q 40/03 |
| 2019/0251492 A1* | 8/2019 | Bender | G06N 3/042 |
| 2020/0184425 A1 | 6/2020 | Mondal | |
| 2020/0184480 A1* | 6/2020 | Wang | G06Q 20/3224 |
| 2020/0250782 A1* | 8/2020 | Zaich | G06F 16/24 |
| 2020/0259643 A1* | 8/2020 | Pazhoor | G06F 21/32 |
| 2020/0273127 A1* | 8/2020 | Aldworth | G06Q 20/02 |
| 2020/0327505 A1 | 10/2020 | Gomes | |
| 2021/0042772 A1* | 2/2021 | Liu | H04L 67/535 |
| 2021/0073737 A1 | 3/2021 | Flynn | |
| 2021/0097472 A1* | 4/2021 | Inamdar | G06N 20/00 |
| 2021/0103876 A1* | 4/2021 | Petrosso | G06F 40/56 |
| 2021/0233030 A1* | 7/2021 | Preuss | G06Q 10/1053 |
| 2021/0350078 A1* | 11/2021 | Choudhury | G06F 40/284 |
| 2021/0383229 A1* | 12/2021 | Hanna | G06Q 10/1053 |
| 2021/0383308 A1* | 12/2021 | Hanna | G06Q 10/06398 |
| 2021/0383330 A1 | 12/2021 | Currie | |
| 2021/0398082 A1* | 12/2021 | Trevisiol | G06Q 10/06398 |
| 2022/0004995 A1 | 1/2022 | Pachori | |
| 2022/0012672 A1* | 1/2022 | Inman | G06F 21/32 |
| 2022/0083871 A1* | 3/2022 | Nemirovsky | G06N 3/088 |
| 2022/0128974 A1* | 4/2022 | Fukami | G05B 19/4183 |
| 2022/0174532 A1* | 6/2022 | Kim | H04B 7/0695 |
| 2022/0391850 A1* | 12/2022 | Morris | G06Q 10/1053 |

\* cited by examiner

APPARATUS AND METHODS FOR EMPLOYMENT APPLICATION ASSESSMENT

FIELD OF THE INVENTION

The present invention generally relates to the field of data tracking. In particular, the present invention is directed to apparatuses and methods for integrated application tracking.

BACKGROUND

Current systems for application tracking cannot properly recognize the quality within an application outside of the typical grammar rules most systems are configured to analyze with.

SUMMARY OF THE DISCLOSURE

In an aspect, an apparatus for integrated application tracking is described. The apparatus including a cloud platform, a processor, and a memory communicatively connected to the processor, the memory containing instructions configuring the processor to receive a plurality of user data related to a user, parse the plurality of user data into a key work record, generate a user metric, as a function of the key work record, based on a plurality of weighted values reflecting desirability, wherein generating the user metric includes identifying at least a negative factor in the key work record, and adjusting the plurality of weighted values as a function of the at least a negative factor and a temporal displacement of the at least a negative factor.

In another aspect, a method for integrated application tracking is described. The method includes using a computing device configured with a cloud platform to receive a plurality of user data related to a user, parse the plurality of user data into a key work record, generate a user metric, as a function of the key work record, based on a plurality of weighted values reflecting desirability, wherein generating the user metric includes identifying at least a negative factor in the key work record, and adjusting the plurality of weighted values as a function of the at least a negative factor and a temporal displacement of the at least a negative factor.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for integrated application tracking.

Aspects of the present disclosure can be used by hiring entities in optimizing interview selections of job candidates by receiving a scored analytical report highlighting the key elements of a job candidate. Aspects of the present disclosure allow for job candidates to easily access a plurality of job listings, typical listed throughput numerous jobs matching websites, into one centralized resource system to upload, for example, a resume to. Exemplary embodiments illustrating aspects of the present disclosure are described below in the context of several specific examples.

Figure 1:
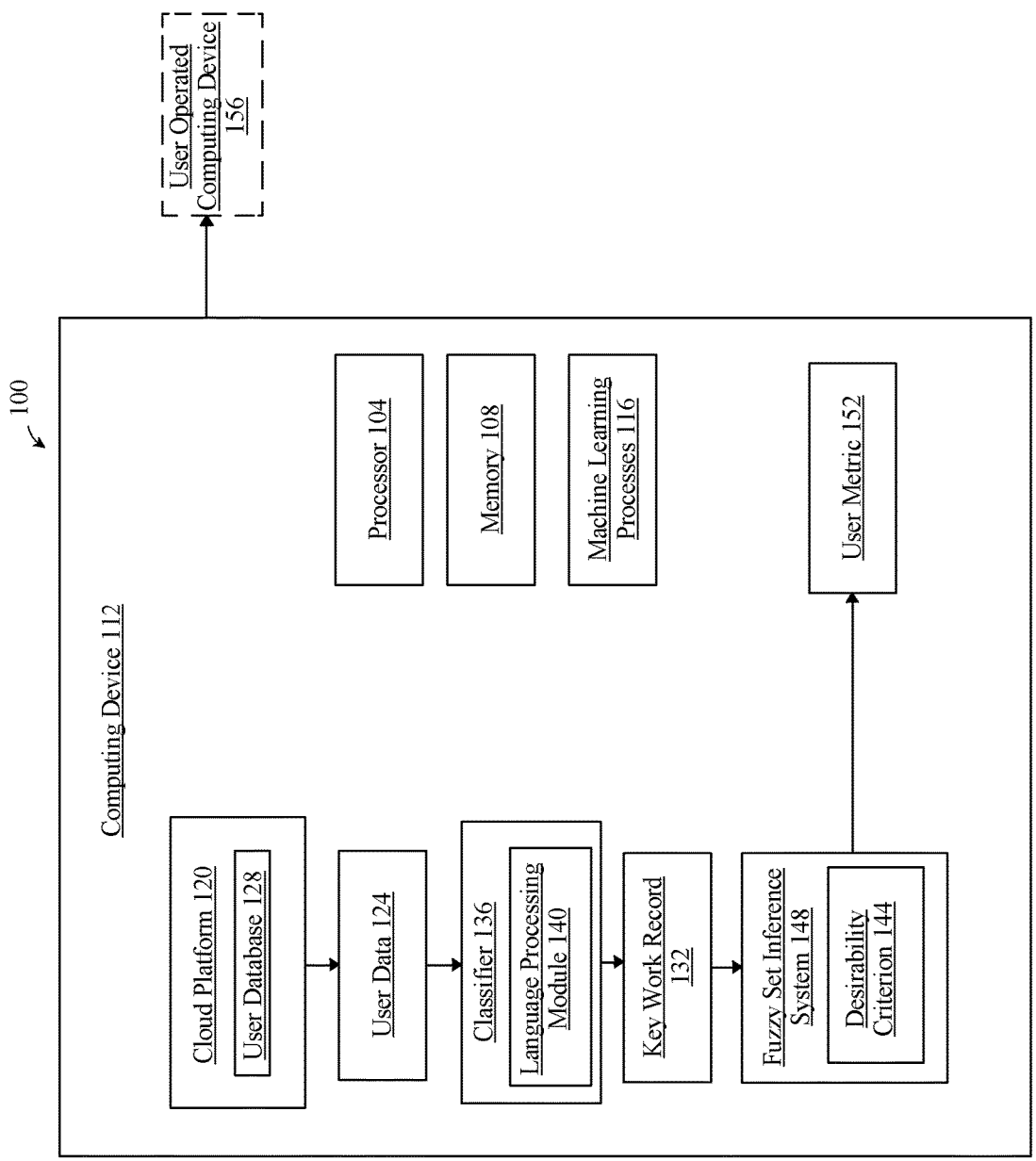
FIG. 1 is a block diagram of an embodiment of an apparatus for integrated application tracking.

Referring now to FIG. 1, an exemplary embodiment of an apparatus 100 for integrated application tracking is illustrated. Apparatus 100 includes a processor 104 and a memory 108 communicatively connected to processor 104, wherein memory 108 contains instructions configuring processor 104 to carry out the process. Processor 104 and memory 108 is contained in a computing device 112. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. A computing device 112 may include any computing device as described in this disclosure, including without limitation a microcontroller, microprocessor, digital signal processor (DSP) and/or system on a chip (SoC) as described in this disclosure. Computing device 112 may include, be included in, and/or communicate with a mobile device such as a mobile telephone or smartphone. Computing device 112 may include a single computing device operating independently, or may include two or more computing device operating in concert, in parallel, sequentially or the like; two or more computing devices may be included together in a single computing device or in two or more computing devices. Computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 112 may include but is not limited to, for example, a computing device or cluster of computing devices in a first location and a second computing device or cluster of computing devices in a second location. Computing device 112 may include one or more computing devices dedicated to data storage, security, distribution of traffic for load balancing, and the like. Computing device 112 may distribute one or more computing tasks as described below across a plurality of computing devices of computing device, which may operate in parallel, in series, redundantly, or in any other manner used for distribution of tasks or memory between computing devices. Computing device 112 may be implemented using a "shared nothing" architecture in which data is cached at the worker, in an embodiment, this may enable scalability of apparatus 100 and/or computing device 112.

With continued reference to FIG. 1, processor 104 and/or computing device 112 may be designed and/or configured by memory 108 to perform any method, method step, or sequence of method steps in any embodiment described in this disclosure, in any order and with any degree of repetition. For instance, processor 104 and/or computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 and/or computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 and/or computing device 112 may perform determinations, classification, and/or analysis steps, methods, processes, or the like as described in this disclosure using machine learning processes 116. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process 116 may utilize supervised, unsupervised, lazy-learning processes and/or neural networks, described further below.

Still referring to FIG. 1, apparatus 100 includes a cloud platform 120. As used in this disclosure, a "cloud platform" is a cloud service that facilitates the flow of user data 124 from front-end clients (e.g. users' servers, tablets, desktops, laptops—anything on the users' end), through the internet, to the provider's systems, and back. As used in this disclosure, a "front-end client", is a computing device, referred to as a client, connected to the cloud platform through at least a network, like the internet, that send requests to the cloud service for webpages or applications, and the cloud service serves up responses. People can access cloud services with nothing more than a computer, operating system, and internet connectivity or virtual private network (VPN). In some embodiments, cloud platform 120 may include a platform as a service (PaaS). Platform as a service (PaaS) or application platform as a service (aPaaS) or platform-based service is a category of cloud computing services that allows customers to provision, instantiate, run, and manage a modular bundle comprising a computing platform and one or more applications, without the complexity of building and maintaining the infrastructure typically associated with developing and launching the application(s); and to allow developers to create, develop, and package such software bundles. Cloud platform 120 may be integrated into a network and enable people such as job candidates and job recruiters to interact. Cloud platform 120 may include an omnichannel configured to expand talent acquisition throughout various channels, search engines, websites, and the like. As used in this disclosure, a "omnichannel," is a lead nurturing and user engagement approach in which a company gives access to their products, offers, and support services to customers or prospects on all channels, platforms, and devices. For example, cloud platform 120 may centralize a plurality of job listings from a particular company that were scattered on numerous websites for job applicants to easily access through the cloud service.

Still referring to FIG. 1, processor 104 and/or computing device 112 is configured receive a plurality of user data 124 related to a user. As used in this disclosure, "user data," is any information describing a user's work history, personality, career goals and the like. A user may be a job-applicant. User data 124 may include a resume, cover letter, work history, academic history, references, field of industry, area of expertise, and the like thereof. Processor 104 and/or computing device 112 may receive from a user database 128 stored on Cloud platform 120 the plurality of user data 124. As used in this disclosure, a "user database" is a resource storage system used to collect and store any information received from a user, such as videos, images, documents, and the like. User database 128 may be implemented, without limitation, as a relational database, a key-value retrieval database such as a NOSQL database, or any other format or structure for use as a database that a person skilled in the art would recognize as suitable upon review of the entirety of this disclosure. User database 128 may alternatively or additionally be implemented using a distributed data storage protocol and/or data structure, such as a distributed hash table or the like. User database 128 may include a plurality of data entries and/or records as described above. Data entries in a user database 128 may be flagged with or linked to one or more additional elements of information, which may be reflected in data entry cells and/or in linked tables such as tables related by one or more indices in a relational user database 128. Persons skilled in the art, upon reviewing the entirety of this disclosure, will be aware of various ways in which data entries in a user database 128 may store, retrieve, organize, and/or reflect data and/or records as used herein, as well as categories and/or populations of data consistently with this disclosure.

In some embodiments, user data 124 may include a video resume. As used in this disclosure, a "video resume" is an item of digital media in visual and/or audio form to provide a recording promoting a user as illustrated in U.S. patent application Ser. No. 17/582,070, filed on Jan. 24, 2022, and entitled "SYSTEMS AND METHODS FOR PARSING AND COMPARING VIDEO RECORD DUPLICATIONS", the entirety of which is incorporated by reference in this disclosure. In some cases, the video resume may include content that is representative or communicative of at least an attribute of the user. Attributes may include the user's skills, competencies, experience, credentials, talents, and the like. The user may be represented directly by the video resume. For example, in some cases, an image component may represent a visual of the user. As used in this disclosure, an "image component" may be a visual representation of information, such as a plurality of temporally sequential frames and/or pictures, related to the video resume. For example, an image component may include animations, still imagery, recorded video, and the like.

With continued reference to FIG. 1, in some embodiments, an image component may include or otherwise represent verbal content. For instance, written or visual verbal content may be included within an image component. Visual verbal content may include images of written text represented by an image component. For example, visual verbal content may include, without limitation, digitally generated graphics, images of written text (e.g., typewritten, and the like), signage, and the like.

Still referring to FIG. 1, in some embodiments, an image component may include or otherwise represent audible verbal content related to at least an attribute of a user. As used in this disclosure, "audible verbal content" is oral (e.g., spoken) verbal content. In some cases, audible verbal content may be included within the video resume by way of an audio component. As used in this disclosure, an "audio component" is a representation of audio, for example a sound, a speech, and the like. In some cases, verbal content may be related to at least an attribute of subject. Additionally, or alternatively, visual verbal content and audible verbal content may be used as inputs to classifier 136 136s as described throughout this disclosure.

Still referring to FIG. 1, in some cases, processor 104 and/or computing device 112 may use audiovisual speech recognition (AVSR) processes to recognize verbal content in the video resume. For example, processor 104 and/or computing device 112 may use image content to aid in recognition of audible verbal content such as viewing a user move their lips to speak on video to process the audio content of the video resume. AVSR may use an image component to aid the overall translation of the audio verbal content of the video resume. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstrum coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content. For instance, audio vector and image vector may each be concatenated and used to predict speech made by a user, who is 'on camera.' Other applicable methods of acquiring verbal content are illustrated in U.S. patent application Ser. No. 17/582,070, filed on Jan. 24, 2022, and entitled "SYSTEMS AND METHODS FOR PARSING AND COMPARING VIDEO RECORD DUPLICATIONS", the entirety of which is incorporated by reference in this disclosure.

Still referring to FIG. 1, processor 104 and/or computing device 112 is configured to parse the plurality of user data 124 into a key work record 132. As used in this disclosure, a "key work record," is an aggregated plurality of user data elements into one document. Key work record 132 may contain the length of work experience, type of work experience (i.e. managerial work, entry level work, etc.), quality of service, and the like. Key work record 132 may include whether a user has been fired from a job, whether a user had difficulties at a job, work achievements, work awards, etc. In some embodiments, key work record 132 may be elements of user data 124 identified by keywords related to a job description. As used in this disclosure, a "keyword" is an element of word or syntax used to identify and/or match elements to each other. For example, a job listing may contain a plurality of work experience requirements of the user that may be used as keywords when parsing through the plurality of user data 124. In some embodiments, parsing using keywords may utilize a language processing module 140 as described further below.

Still referring to FIG. 1, in some embodiments, processor 104 and/or computing device 112 may use a classifier 136 to parse the plurality of user data 124 into a key work record 132. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. For example the algorithm input may the plurality of user data 124 and the output may be the key work record 132. Classifier 136 may be configured to output at least a datum that labels or otherwise identifies a set of data that are clustered together, found to be close under a distance metric as described below, or the like. Processor 104 and/or computing device 112 and/or another device may generate classifier 136 using a classification algorithm, defined as a processes whereby a processor 104 and/or computing device 112 derives classifier 136 from training data. In an embodiment, training data may include user database 128, a job description, and any other training data described throughout this disclosure. Language processing module 140 may include any hardware and/or software module to extract elements of user data 124 related to the keywords of a job listing. For example, the module may be used to extract from the plurality of user data 124 all information pertaining to "web developer, 5-10 years experience, California based ". Language processing module 140 may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module 140 may operate to produce a language processing model. Language processing model may include a program automatically generated by computing device and/or language processing module 140 to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module 140 and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module 140 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 140 may use a corpus of documents to generate associations between language elements in a language processing module 140, and diagnostic engine may then use such associations to analyze words extracted from one or more documents and determine that the one or more documents indicate significance of a category. In an embodiment, language module and/or processor 104 and/or computing device 112 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 104 and/or computing device 112. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, processor 104 and/or computing device 112 may be configured to generate a classifier 136 using a Naive Bayes classification algorithm. Naive Bayes classification algorithm generates classifiers by assigning class labels to problem instances, represented as vectors of element values. Class labels are drawn from a finite set. Naive Bayes classification algorithm may include generating a family of algorithms that assume that the value of a particular element is independent of the value of any other element, given a class variable. Naive Bayes classification algorithm may be based on Bayes Theorem expressed as P(A/B)=P(B/A) P(A)±P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naive Bayes algorithm may be generated by first transforming training data into a frequency table. Processor 104 and/or computing device 112 may then calculate a likelihood table by calculating probabilities of different data entries and classification labels. Processor 104 and/or computing device 112 may utilize a naive Bayes equation to calculate a posterior probability for each class. A class containing the highest posterior probability is the outcome of prediction. Naive Bayes classification algorithm may include a gaussian model that follows a normal distribution. Naive Bayes classification algorithm may include a multinomial model that is used for discrete counts. Naive Bayes classification algorithm may include a Bernoulli model that may be utilized when vectors are binary.

With continued reference to FIG. 1, processor 104 and/or computing device 112 may be configured to generate a classifier 136 using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier 136 to select the k most similar entries training data to a given sample, determining the most common classifier 136 of the entries in the database, and classifying the known sample; this may be performed recursively and/or iteratively to generate a classifier 136 that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, processor 104 and/or computing device 112 is configured to generate a user metric 152, as a function of key work record 132, based on a plurality of weighted values reflecting desirability. "Desirability," as used in this disclosure, is the appeal of user to a hiring entity. Desirability may be the overall fit of a user to a job posting. As used in this disclosure, a "user metric" is a match score based on user data 124 analysis pertaining to the level of compatibility of a user to a job listing. User metric 152 may be represented as a percentage, linguistic score, or a number on a scale. In an embodiment, generating user metric 152 may include a scoring method that adds a certain number of points to the plurality of weighted values for positive factors in key work record 132. As used in this disclosure, a "positive factor" is information pertaining to a user demonstrating positive or affirmative qualities. For example a positive factor may be each year of service in an industry, managerial position acquired, internship, awards, and the like. Generating user metric 152 includes processor 104 and/or computing device 112 identifying at least a negative factor in key work record 132 and adjusting the plurality of weighted values as a function of the at least a negative factor and a temporal displacement of the at least a negative factor. As used in this disclosure, a "negative factor" is information pertaining to a user that indicates negative or undesirable qualities in the user or the user's history. For example, negative factors could include a user having been fired, history of misconduct, malpractice, formal complaints, and the like. The temporal displacement is the date(s) in time pertaining to when a positive or negative factor occurred, for how long the positive or negative factor lasted, or the time elapsed since the occurrence of the positive or negative factor. For example, the temporal displacement may be the calendar date in which a job applicant was fired from a previous job. In some embodiments, processor 104 and/or computing device 112 may use a classifier, similar to classifier 136, with training data including private and/or public resources, immutable sequential listing, or databases, described further below, to identify a plurality of negative factors that may not be found in the plurality of user data 124 related to a user. For example, the classifier may take the contact information of the user, such as name, addresses, and phone number, and with the training data, find public records of formal work complaints filed against the user. In some embodiments, the length, amount, and severity of a temporal displacement for a negative factor may negatively impact the weighted values. For example, a suspension from the practice of law that lasted five years for noncompliance may have a larger negative impact then a plurality of unpaid parking tickets issued in the span of three months. In some embodiments, the length, amount, and quality of a temporal displacement for a positive factor may out weigh, lower, or nullify the negative impact of a negative factor. For example, the negative impact of a user that was fired from their job three years prior for noncompliance with company rules may be balanced and/or canceled out by the same user being identified as an inventor in a critical patent issued in the present year related to the work industry the hiring entity is in.

In some embodiments, generating user metric 152 may include a fuzzy set inference system 148, as described further below, to calculate and aggregate a plurality of sub-scores based on a desirability criterion 144. As used in this disclosure, a "desirability criterion" is a criterion that indicates the appeal of an applicant to a hiring entity. For example, desirability criterion 144 may be generated based on training data including a job listing, user metric feedback from a hiring entity, and a plurality of user data 124 related a plurality of users. As used in this disclosure, "user metric feedback" is samples and examples of ideal and poorly generated user metrics 152 reviewed and/or crafted by a user, hiring entity or apparatus 100 administrator. For example, user metric feedback may contain reviews by users and hiring entities on past generated user metrics 152. In some embodiments, user metric feedback may be examples submitted by at least a hiring entity on ideal user metrics 152 and/or ideal elements of a desirability criterion 144. For example, elements of the desirability criterion 144 may be threshold requirements pertaining to, experience level, geographic location, salary requirements, number of negative factors, etc.

Still referring to FIG. 1, in some embodiments, processor 104 and/or computing device 112 may be configured to verify the key work record 132 prior to generating a user metric 152. Verification may be based on the veracity of the elements of user data 124 contained in key work record 132. As used in this disclosure, "veracity" is conformity with truth or fact. For example, veracity may be confirmed by following up on work history and/or confirming the identify of references. In an embodiment, processor 104 and/or computing device 112 may be configured to verify by using a classifier, as described above, wherein the training data may include previously validated elements user data 124 of the related user and historical data from private and/or public resources or databases. For example, key work record 132 containing information that a user published their dissertation while obtaining their PhD at University of X may be inputted into the classification algorithm wherein the training data includes a private and/or public academic database to confirm this information. In some embodiments, the output of classifier 136 may be broken down into two data bins. The first data bin may contain the plurality of verified elements of user data 124 and the second data bin may contain nonverified elements of user data 124. Nonverified elements of user data 124 may not have been able to be verified by processor 104 and/or computing device 112 based on lack of resources or it may be the elements of user data 124 were found to be false. In some embodiments, false elements of user data 124 may be inputted as negative factors in generating the user metric 152.

Still referring to FIG. 1, in some embodiments, processor 104 and/or computing device 112 may be configured to output an annotated copy of key work record 132 to a user, identifying the calculated plurality of sub-scores based on desirability criterion 144. As used in this disclosure, an "annotated copy", is a copy of a key work record containing additional notes. The annotated copy may have a column section with the corresponding plurality of sub-scores listed next to the corresponding information contained in key work record 132. In some, embodiments, the annotated copy may attach a breakdown of desirability criterion 144, identifying the plurality of positive and negative factors that affected the weighted values. In some embodiments, processor 104 and/or computing device 112 my output an electric notification to user operated computing device 156, such as an email containing key work record 132 annotated by highlighting the parsed elements of user data 124 that were used to generate user metric 152. The highlighted parsed elements may include the generated sub-score associated with the elements of user data 124. This may allow a user to see the elements of user data 124 and weighted values that went into generating user metric 152.

Still referring to FIG. 1, processor 104 and/or computing device 112 may be configured to output user metric 152 to a display device. A "display device", as used herein is an output device for presentation of information in visual or tactile form. In one or more embodiments, the display device may be communicatively connected to computing device 112. The display device may be remote to computing device 112 or integrated into computing device 112. In some embodiments, the display device may be a computing device 156 operated by a user, hiring entity, and the like. In some embodiments, processor 104 and/or computing device 112 may be configured to re-evaluate user metric 152 on a predetermined routine basis. For example, processor 104 and/or computing device 112 may be configured to re-evaluate on a monthly, yearly, or weekly basis until the plurality of data related to the user is removed from user database 128. As used in the disclosure, "re-evaluation" in the regenerating of a user metric based on the same or newly generated key work record related to a user. Re-evaluation may be trigged by the upload of additional user information to user database 128. Re- evaluation may be triggered by feedback received from a user and/or hiring entity. Re-evaluation may be requested by a user or hiring entity. Re-evaluation may be requested by a hiring entity with the submission of new samples or examples of how user metric 152 should be generated. In some embodiments, re-evaluation of user metric 152 includes the re-calculation of the weighted values based on additional temporal displacements, positive factors, and/or negative factors.

Figure 2:
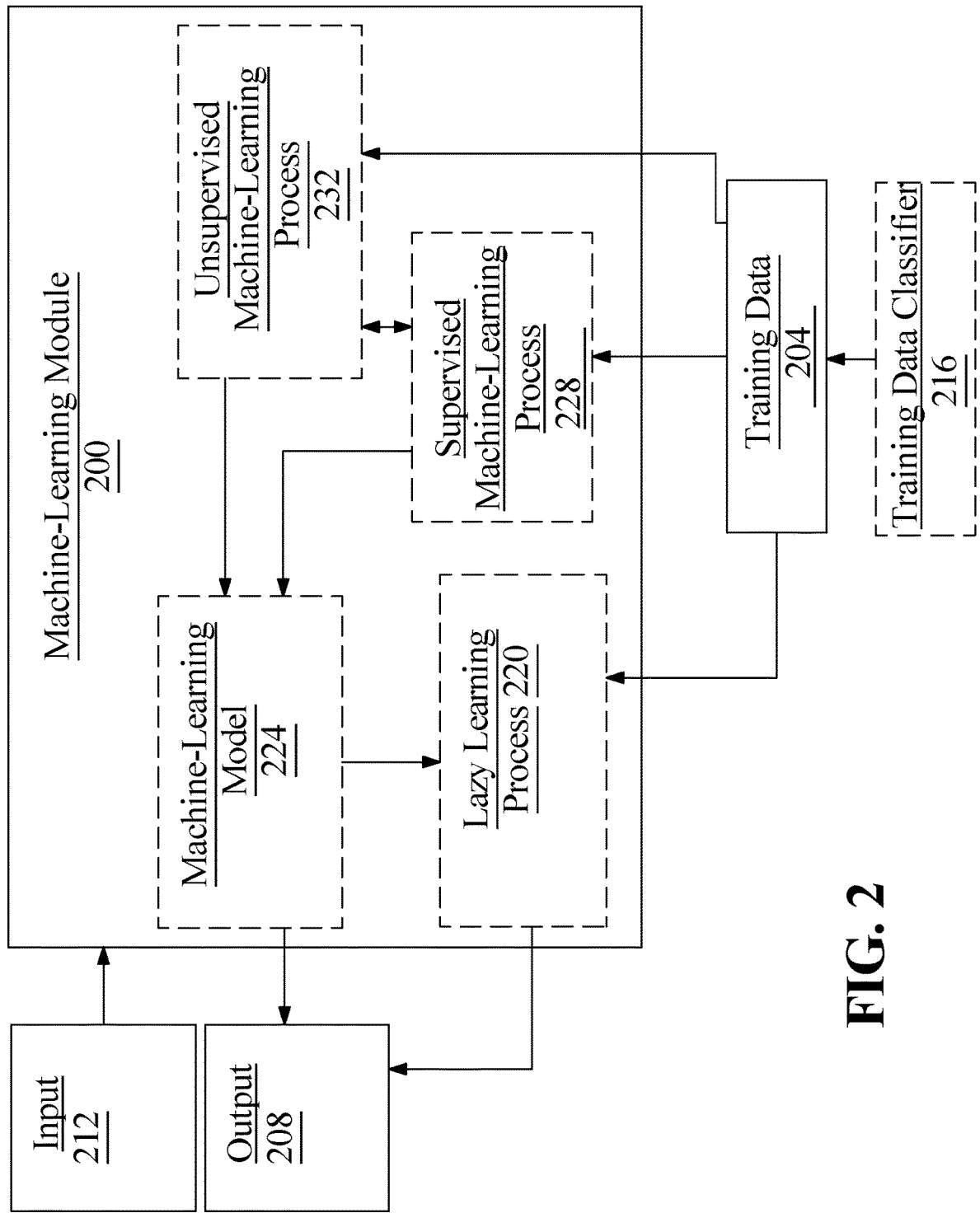
FIG. 2 is a block diagram of exemplary embodiment of a machine learning module.

Referring now to FIG. 2, an exemplary embodiment of a machine-learning module 200 that may perform one or more machine-learning processes 116 as described in this disclosure is illustrated. Machine-learning module may perform determinations, classification, and/or analysis steps, methods, processes, or the like as described in this disclosure using machine learning processes.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier generated by a machine learning algorithm known as a "classification algorithm". Machine-learning module 200 may generate a classifier using a classification algorithm, defined as a processes whereby a computing device and/or any module and/or component operating thereon derives a classifier from training data 204.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any inputs and outputs described throughout this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
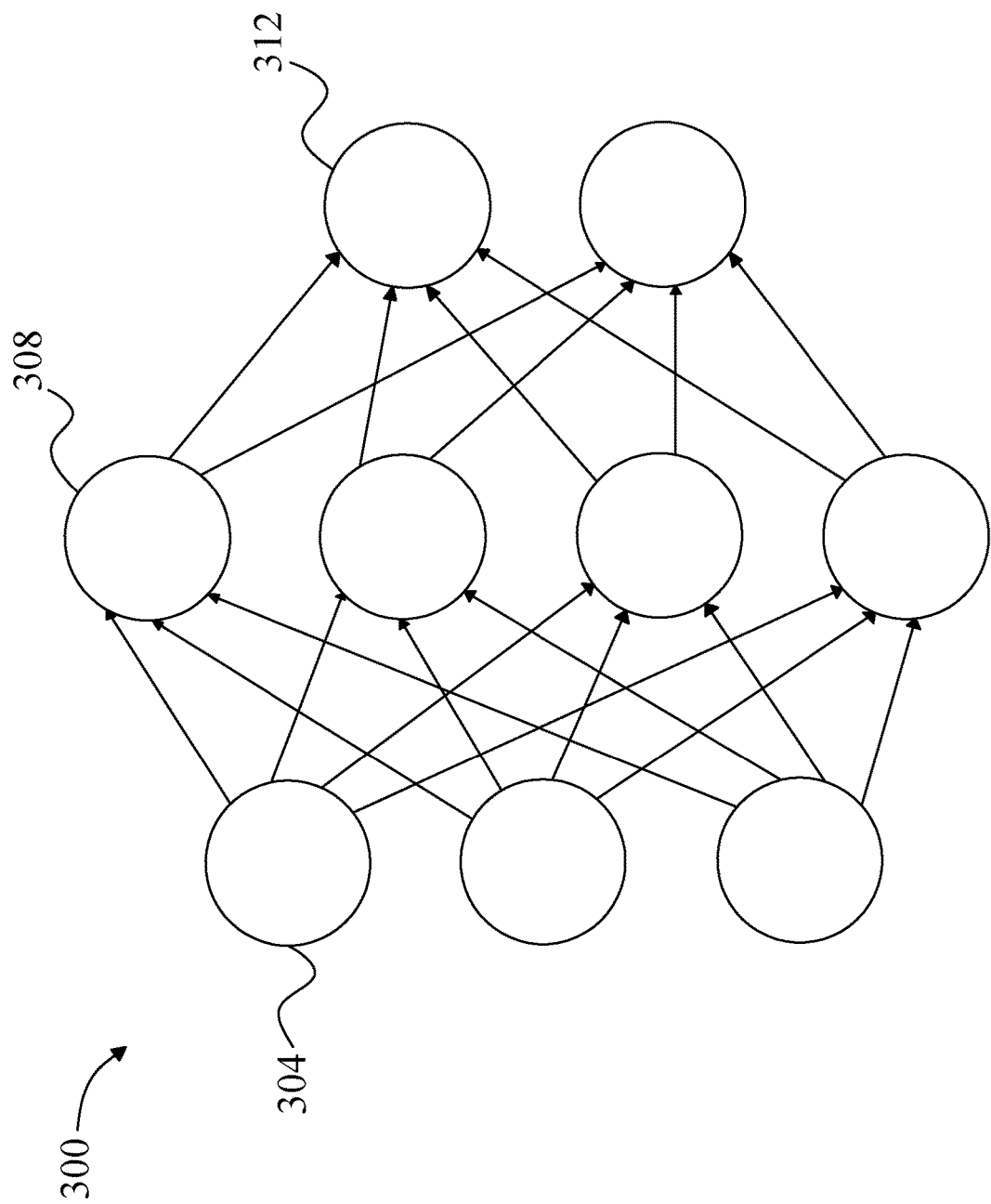
FIG. 3 illustrates an exemplary nodal network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
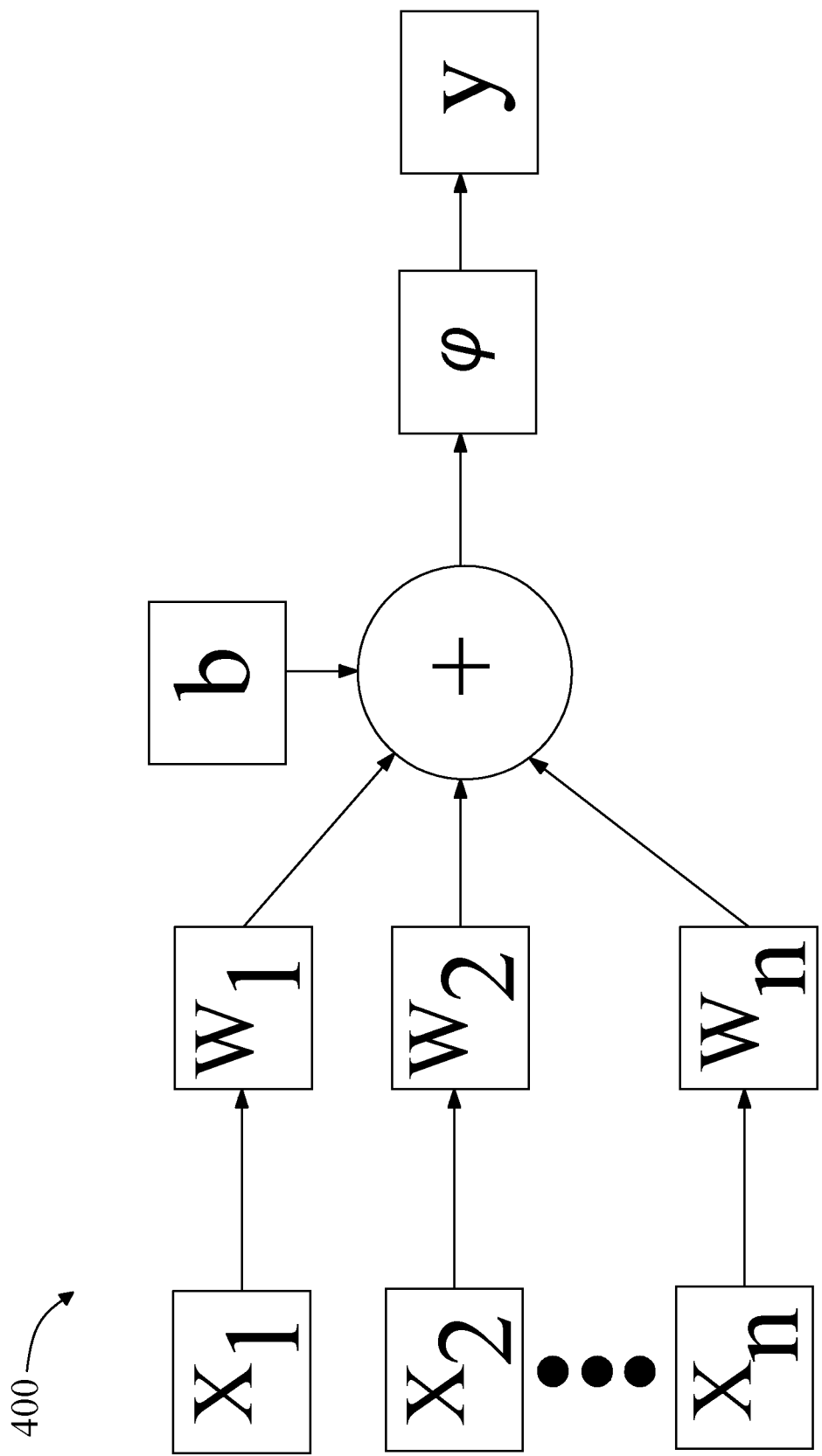
FIG. 4 is a block diagram of an exemplary node.

Referring now to FIG. 4, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights wi that are multiplied by respective inputs xi. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 5:
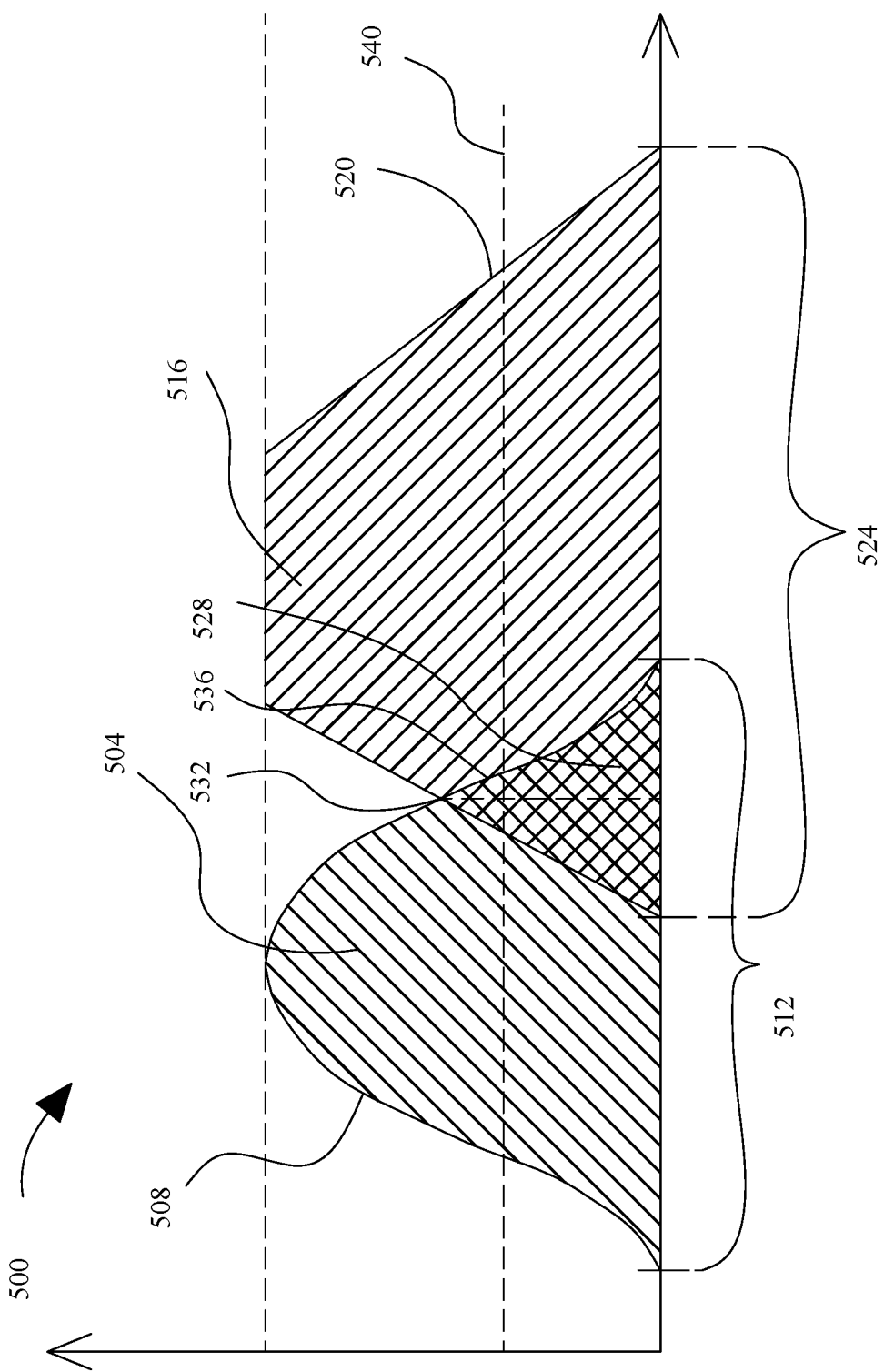
FIG. 5 is a graph illustrating an exemplary relationship between fuzzy sets.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models such as elements of key work record 132. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or elements of key work record 132 and a predetermined class, such as without limitation elements of a desirability criterion 144, for combination to occur as described above. Alternatively or additionally, each threshold may be tuned by a machine-learning and/or statistical process, for instance and without limitation as described in further detail below.

Further referring to FIG. 5, in an embodiment, a degree of match between fuzzy sets may be used to classify elements of key work record 132 with elements of a desirability criterion 144. For instance, if elements of key work record 132 have a fuzzy set matching elements of a desirability criterion 144 fuzzy set by having a degree of overlap exceeding a threshold, processor 104 and/or computing device 112 may classify the elements of key work record 132 as belonging to the elements of a desirability criterion 144. Where multiple fuzzy matches are performed, degrees of match for each respective fuzzy set may be computed and aggregated through, for instance, addition, averaging, or the like, to determine an overall degree of match.

Still referring to FIG. 5, in an embodiment, elements of key work record 132 may be compared to multiple elements of a desirability criterion 144 fuzzy sets. For instance, elements of key work record 132 may be represented by a fuzzy set that is compared to each of the multiple elements of a desirability criterion 144 fuzzy sets; and a degree of overlap exceeding a threshold between the elements of key work record 132 fuzzy set and any of the multiple elements of a desirability criterion 144 fuzzy sets may cause processor 104 and/or computing device 112 to classify the elements of key work record 132 as belonging to elements of a desirability criterion 144. For instance, in one embodiment there may be two elements of a desirability criterion 144 fuzzy sets, representing respectively first element of a desirability criterion 144 and second element of a desirability criterion 144. First element of a desirability criterion 144 may have a first fuzzy set; Second element of a desirability criterion 144 may have a second fuzzy set; and elements of key work record 132 may have elements of key work record 132 fuzzy set. Processor 104 and/or computing device 112, for example, may compare elements of key work record 132 fuzzy set with each of first element of a desirability criterion 144 fuzzy set and second element of a desirability criterion 144 fuzzy set, as described above, and classify elements of key work record 132 to either, both, or neither first element of a desirability criterion 144 or second element of a desirability criterion 144. Machine-learning methods as described throughout may, in a non-limiting example, generate coefficients used in fuzzy set equations as described above, such as without limitation x, c, and σ of a Gaussian set as described above, as outputs of machine-learning methods. Likewise, elements of key work record 132 may be used indirectly to determine a fuzzy set, as elements of key work record 132 fuzzy set may be derived from outputs of one or more machine-learning models that take the elements of key work record 132 directly or indirectly as inputs.

Still referring to FIG. 5, a computing device may use a logic comparison program, such as, but not limited to, a fuzzy logic model to determine a plurality of user metric 152 sub-scores. A plurality of user metric 152 sub-scores may include, but is not limited to, amateur, average, knowledgeable, superior, and the like; the plurality of user metric 152 sub-scores may be represented as a value for a linguistic variable representing the desirability of a user to a hiring entity or in other words a fuzzy set as described above that corresponds to a degree of desirability as calculated using any statistical, machine-learning, or other method that may occur to a person skilled in the art upon reviewing the entirety of this disclosure. In other words, a given element of elements of key work record 132 may have a first non-zero value for membership in a first linguistic variable value such as "superior" and a second non-zero value for membership in a second linguistic variable value such as "inadequate" In some embodiments, determining a plurality of user metric 152 sub-scores may include using a linear regression model. A linear regression model may include a machine learning model. A linear regression model may be configured to map data of elements of key work record 132, such as elements of elements of key work record 132, to a plurality of user metric 152 sub-scores. A linear regression model may be trained using any training data as described throughout this disclosure. A linear regression model may map statistics such as, but not limited to, a user's work history, a user; s engagement in a particular field of work, and the like. In some embodiments, determining a plurality of user metric 152 sub-scores of elements of key work record 132 may include using a user metric 152 sub-score classification model. A user metric 152 sub-score classification model may be configured to input collected data and cluster data to a centroid based on, but not limited to, frequency of appearance, linguistic indicators of desirability, and the like. Centroids may include scores assigned to them such that elements of key work record 132 may each be assigned a score. In some embodiments, a user metric 152 sub-score classification model may include a K-means clustering model. In some embodiments, a user metric 152 sub-score classification model may include a particle swarm optimization model. In some embodiments, determining a plurality of user metric 152 sub-scores of elements of key work record 132 may include using a fuzzy inference engine. A fuzzy inference engine may be configured to map one or more elements of key work record 132 data elements using fuzzy logic. In some embodiments, a plurality of entity assessment devices may be arranged by a logic comparison program into desirability arrangements. An "desirability arrangement" as used in this disclosure is any grouping of objects and/or data based on skill level and/or output score. This step may be implemented as described above in FIGS. 1-4. Membership function coefficients and/or constants as described above may be tuned according to classification and/or clustering algorithms. For instance, and without limitation, a clustering algorithm may determine a Gaussian or other distribution of questions about a centroid corresponding to a given desirability level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented according to input and/or output membership functions and/or linguistic variables. For instance, a first linguistic variable may represent a first measurable value pertaining to elements of key work record 132, such as a degree of desirability of an element of elements of key work record 132, while a second membership function may indicate a degree of compatibility of a subject thereof, or another measurable value pertaining to elements of key work record 132. Continuing the example, an output linguistic variable may represent, without limitation, a score value. An inference engine may combine rules, such as: if the compatibility level is 'high' and the desirability level is 'high', user metric 152 score to the job listing is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b ≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 6:
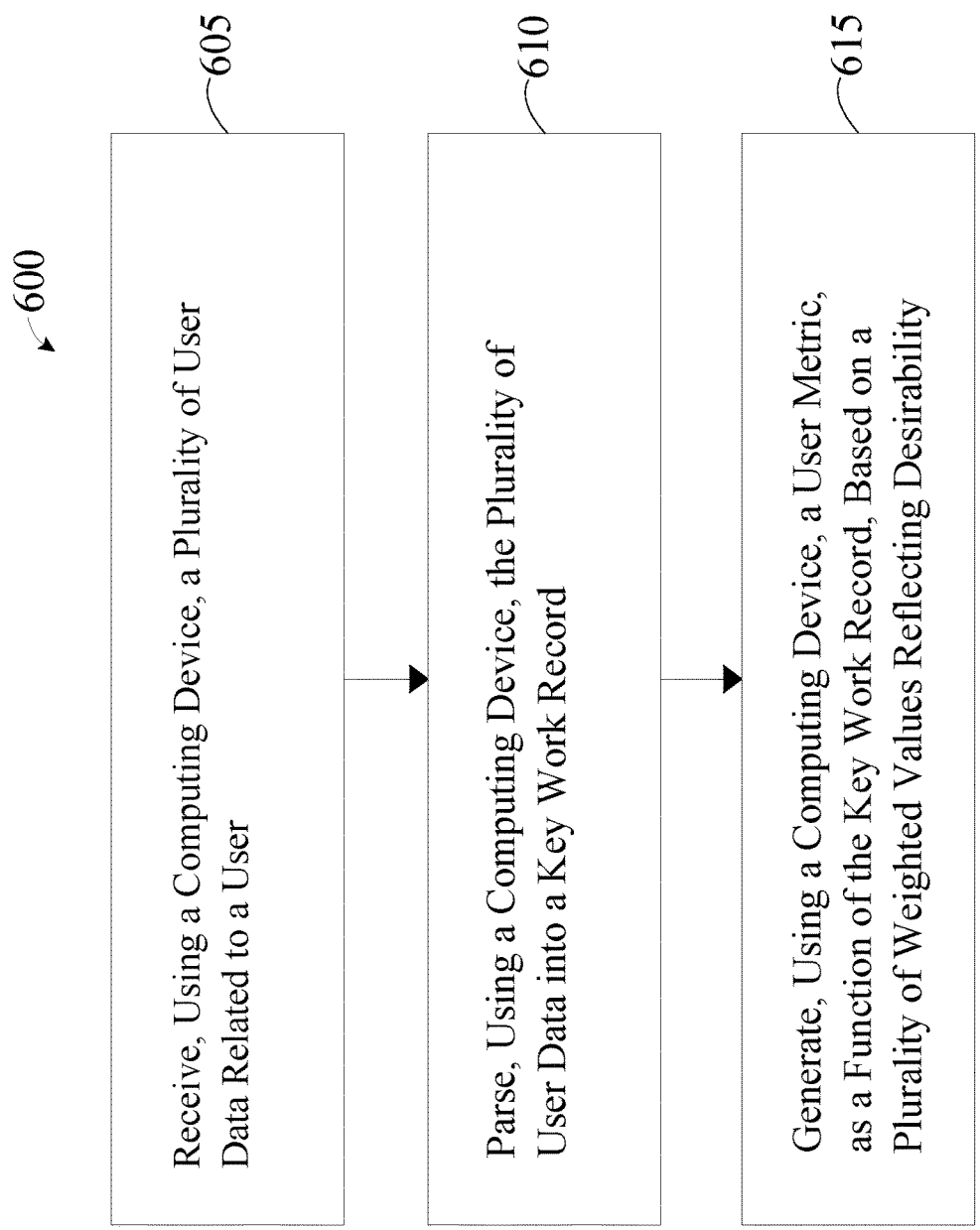
FIG. 6 is a flow diagram of an exemplary method for integrated application tracking.

Referring now to FIG. 6, is in an overview of an exemplary method 600 for integrated application tracking. Method 600 includes using a computing device configured with a cloud platform, for example and with reference to FIGS. 1-5. In some embodiments, the cloud platform includes a platform as a service (PaaS) as described in FIG. 1. Cloud platform may include an omnichannel configured to expand talent acquisition throughout various channels, search engines, websites, and the like. For example, cloud platform may centralize a plurality of job listings from a particular company that were scattered on numerous websites for job applicants to easily access through the cloud service.

Still referring to FIG. 6, at step 605, the computing device is configured receive a plurality of user data related to a user, for example and with reference to FIG. 1. A user may be a job-applicant. The user data may include a resume, cover letter, work history, academic history, references, field of industry, area of expertise, and the like thereof. The computing device may receive from a user database stored on cloud platform the plurality of user data, for example and with reference to FIG. 1. The user database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 6, in some embodiments, user data may include a video resume, for example and with reference to FIG. 1. In some cases, the video resume may include content that is representative or communicative of at least an attribute of the user. Attributes may include the user's skills, competencies, experience, credentials, talents, and the like. The user may be represented directly by the video resume. For example, in some cases, an image component may represent a visual of the user, as described in FIG. 1. For example, an image component may include animations, still imagery, recorded video, and the like. In some embodiments, an image component may include or otherwise represent verbal content. For instance, written or visual verbal content may be included within an image component. Visual verbal content may include images of written text represented by an image component. For example, visual verbal content may include, without limitation, digitally generated graphics, images of written text (e.g., typewritten, and the like), signage, and the like.

Still referring to FIG. 6, in some embodiments, an image component may include or otherwise represent audible verbal content related to at least an attribute of a user, for example and with reference to FIG.1. In some cases, audible verbal content may be included within the video resume by way of an audio component, for example and with reference to FIG. 1. In some cases, verbal content may be related to at least an attribute of subject. Additionally, or alternatively, visual verbal content and audible verbal content may be used as inputs to classifier 136s as described throughout this disclosure.

Still referring to FIG. 6, in some cases, the computing device may use audiovisual speech recognition (AVSR) processes to recognize verbal content in the video resume. For example and with reference to FIG. 1, the computing device may use image content to aid in recognition of audible verbal content such as viewing a user move their lips to speak on video to process the audio content of the video resume. AVSR may use an image component to aid the overall translation of the audio verbal content of the video resume. In some embodiments, AVSR may include techniques employing image processing capabilities in lip reading to aid speech recognition processes.

Still referring to FIG. 6, at step 610, the computing device is configured to parse the plurality of user data into a key work record, for example and with reference to FIG. 1, the key work record may contain the length of work experience, type of work experience (i.e. managerial work, entry level work, etc.), quality of service, and the like. The key work record may include whether a user has been fired from a job, whether a user had difficulties at a job, work achievements, work awards, etc. In some embodiments, the key work record may be elements of user data identified by keywords related to a job description. For example and with reference to FIG. 1, a job listing may contain a plurality of work experience requirements of the user that may be used as keywords when parsing through the plurality of user data. In some embodiments, parsing using keywords may utilize a language processing module as described further below.

Still referring to FIG. 6, in some embodiments, the computing device may use a classifier to parse the plurality of user data into a key work record. For example and with reference to FIGS. 1 and 2, the algorithm input may be the plurality of user data and the output may be the key work record. The classifier may be configured to output at least a datum that labels or otherwise identifies a set of data that are clustered together, found to be close under a distance metric as described below, or the like. In an embodiment, training data may include the user database, a job description, a language processing module, and any other training data described throughout this disclosure. The language processing module may include any hardware and/or software module to extract elements of user data related to the keywords of a job listing.

Still referring to FIG. 6, at step 615, the computing device is configured to generate a user metric, as a function of the key work record, based on a plurality of weighted values reflecting desirability, for example and with reference to FIG. 1. Desirability may the overall fit of a user to a job posting. The user metric may be represented as a percentage, linguistic score, or a number on a scale. In an embodiment, generating the user metric may include a scoring method that adds a certain number of points the plurality of weighted values for each year of service in an industry, a certain number of points for a managerial position, internship, awards, or the like. Generating the user metric includes the computing device identifying at least a negative factor in the key work record and adjusting the plurality of weighted values as a function of the at least a negative factor and a temporal displacement of the at least a negative factor. For example, negative factors could include a user having been fired, history of misconduct, malpractice, formal complaints, and the like. The temporal displacement may pertain to when the negative factor occurred and for how long the negative factor lasted. In some embodiments, the computing device may use a classifier with training data including private and/or public resources, immutable sequential listing, or databases, described further below, to identify a plurality of negative factors not found in the plurality of user data related to a user. For example, the classifier may take the contact information of the user, such as name, addresses, and phone number and with the training data find public records of formal work complaints filed against the user.

In some embodiments, generating the user metric may include a fuzzy set inference system, as described in FIG. 5, to calculate and aggregate a plurality of sub-scores based on a desirability criterion. For example, the desirability criterion may be generated based on training data including the job listing, user metric feedback from a hiring entity, and a plurality of user data related a plurality of users. For example, user metric feedback may contain reviews by users and hiring entities on past generated user metrics. In some embodiments, user metric feedback may be examples submitted by at least a hiring entity on ideal user metrics and/or ideal elements of a desirability criterion. For example, elements of the desirability criterion may pertain to, experience level, geographic location, salary requirements, number of negative factors, etc.

Still referring to FIG. 6, in some embodiments, the computing device may be configured to verify the key work record prior to generating a user metric., for example and with reference to FIG. 1. Verification may be based on the veracity of the elements of user data contained in the key work record. In an embodiment, the computing device may be configured to verify by using a classifier, as described above, wherein the training data may include previously validated elements user data of the related user and historical data from private and/or public resources or databases. The first data bin may contain the plurality of verified elements of user data and the second data bin may contain nonverified elements of user data. Nonverified elements of user data may not have been able to be verified by the computing device based on lack of resources or it may be the elements of user data were found to be false. In some embodiments, false elements of user data may be inputted as negative factors in generating the user metric.

Still referring to FIG. 6, in some embodiments, the computing device may be configured to output an annotated copy of the key work record to a user, identifying the calculated plurality of sub-scores based on a desirability criterion. For example, the computing device may output an electric notification to user operated computing device, such as an email containing the key work record annotated by highlighting the parsed elements of user data that were used to generate the user metric. The highlighted parsed elements may include the generated sub-score associated with the elements of user data. This may allow a user to see the elements of user data and weighted values that went into generating the user metric. The computing device may be configured to output user metric to display device communicatively connected to the computing device, using any network interface described throughout this disclosure, wherein the display device is operated by a user, hiring entity, and the like. In some embodiments, the computing device may be configured to re-evaluate the user metric on a predetermined routine basis. For example, the computing device may be configured to re-evaluate on a monthly, yearly, or weekly basis until the plurality of data related to the user is removed from user database.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
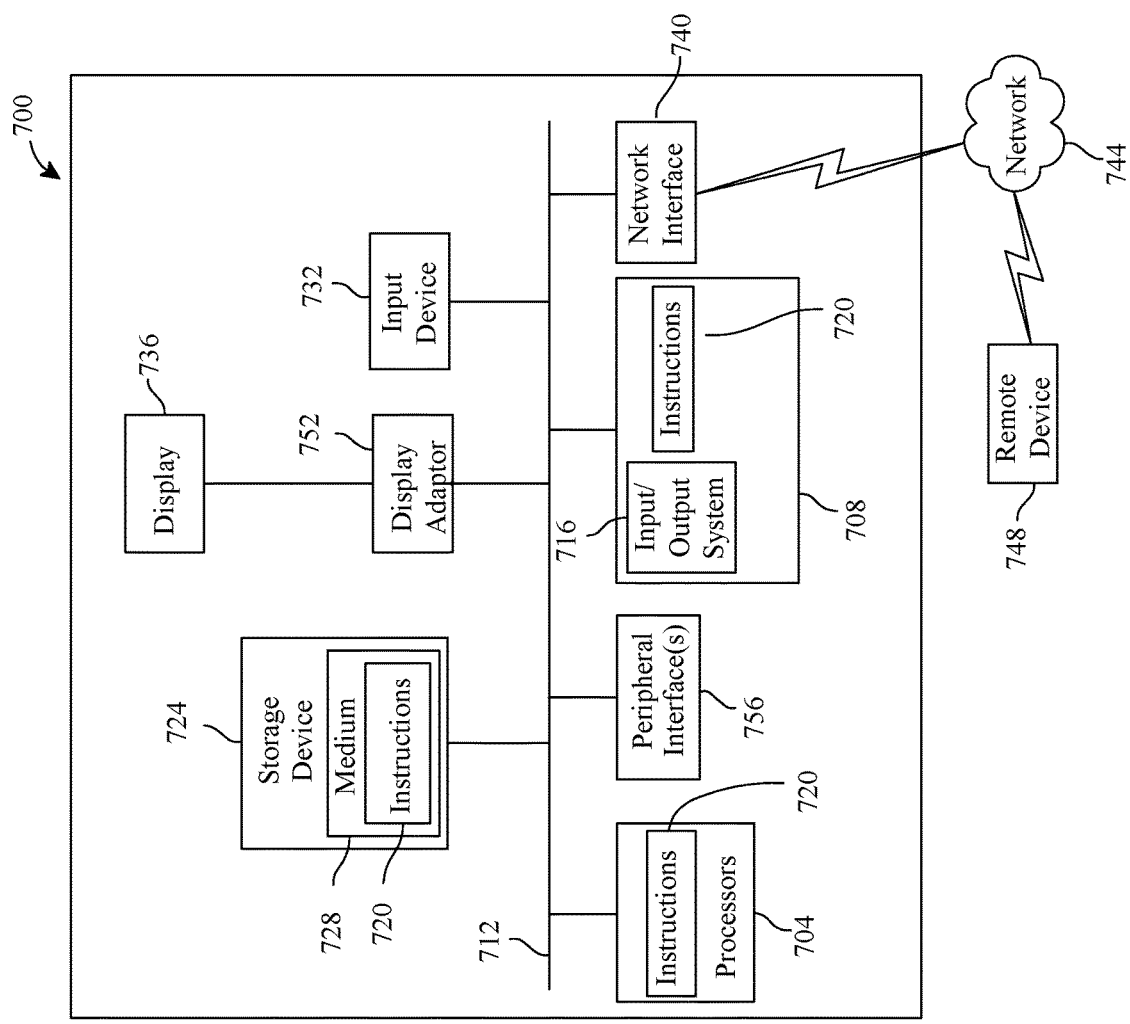
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for integrated application tracking, the apparatus comprising:
 a cloud platform;
 at least a processor; and
 a memory communicatively connected to the processor, the memory containing instructions configuring the at least a processor to:
  receive at least a video resume;
  perform an audiovisual speech recognition (AVSR) process on the video resume to extract a plurality of user data related to a user;
  parse the plurality of user data into a key work record;
  verify the key work record as a function of a verification classifier, wherein verifying the key work record comprises parsing at least an out of the verification classifier into a first data bin comprising verified elements of user data and a second data bin comprising unverified elements of user data; and
  generate a user metric as a function of the key work record and the unverified elements of user data, based on a plurality of weighted values reflecting desirability, wherein generating the user metric comprises:
   identifying at least a negative factor in the key work record; and
   adjusting the plurality of weighted values as a function of the at least a negative factor and a temporal displacement of the at least a negative factor, wherein the temporal displacement is identified using public resource training data.

2. The apparatus of claim 1, wherein the cloud platform comprises a platform as a service (PaaS).

3. The apparatus of claim 1, wherein the plurality of user data related to the user is received from the cloud platform that is configured to store at least a user database.

4. The apparatus of claim 1, wherein parsing the plurality of user data comprises utilizing a classification algorithm comprising:
 training data; and
 a language processing module configured to extract elements of user data related to keywords.

5. The apparatus of claim 1, wherein generating the user metric comprises using a fuzzy set inference system to calculate and aggregate a plurality of sub-scores based on a desirability criterion.

6. The apparatus of claim 5, wherein the desirability criterion comprises training data including at least user metric feedback.

7. The apparatus of claim 1, wherein the memory contains instructions further configuring the processor to output an annotated copy of the key work record to a user, identifying the calculated plurality of sub-scores based on a desirability criterion.

8. The apparatus of claim 1, wherein the memory contains instructions further configuring the processor to re-evaluate the user metric on a predetermined routine basis.

9. A method for integrated application tracking, the method comprising:
 a cloud platform communicatively connected to a computing device, wherein the computing is configured to;
 receive at least a video resume;
 perform an audiovisual speech recognition (AVSR) process on the video resume to extract a plurality of user data related to a user;
 parse the plurality of user data into a key work record;
 verify the key work record as a function of a verification classifier, wherein verifying the key work record comprises parsing at least an out of the verification classifier into a first data bin comprising verified elements of user data and a second data bin comprising unverified elements of user data; and
 generate a user metric as a function of the key work record and the unverified elements of user data, based on a plurality of weighted values reflecting desirability, wherein generating the user metric comprises:
  identifying at least a negative factor in the key work record; and
  adjusting the plurality of weighted values as a function of the at least a negative factor and a temporal displacement of the at least a negative factor, wherein the temporal displacement is identified using public resource training data.

10. The method of claim 9, wherein the cloud platform comprises a platform as a service (PaaS).

11. The method of claim 9, wherein the plurality of user data related to the user is received from the cloud platform that is configured to store at least a user database.

12. The method of claim 9, wherein parsing the plurality of user data comprises utilizing a classification algorithm comprising:
   training data; and
   a language processing module configured to extract elements of user data related to keywords.

13. The method of claim 9, wherein generating the user metric comprises using a fuzzy set inference system to calculate and aggregate a plurality of sub-scores based on a desirability criterion.

14. The method of claim 13, wherein the desirability criterion comprises training data including at least user metric feedback.

15. The method of claim 9, wherein computing device is configured further to output an annotated copy of the key work record to a user, identifying the calculated plurality of sub-scores based on a desirability criterion.

16. The method of claim 9, wherein the memory contains instructions further configuring the processor to re-evaluate the user metric on a predetermined routine basis.

* * * * *